United States Patent Office 3,538,336
Patented Nov. 3, 1970

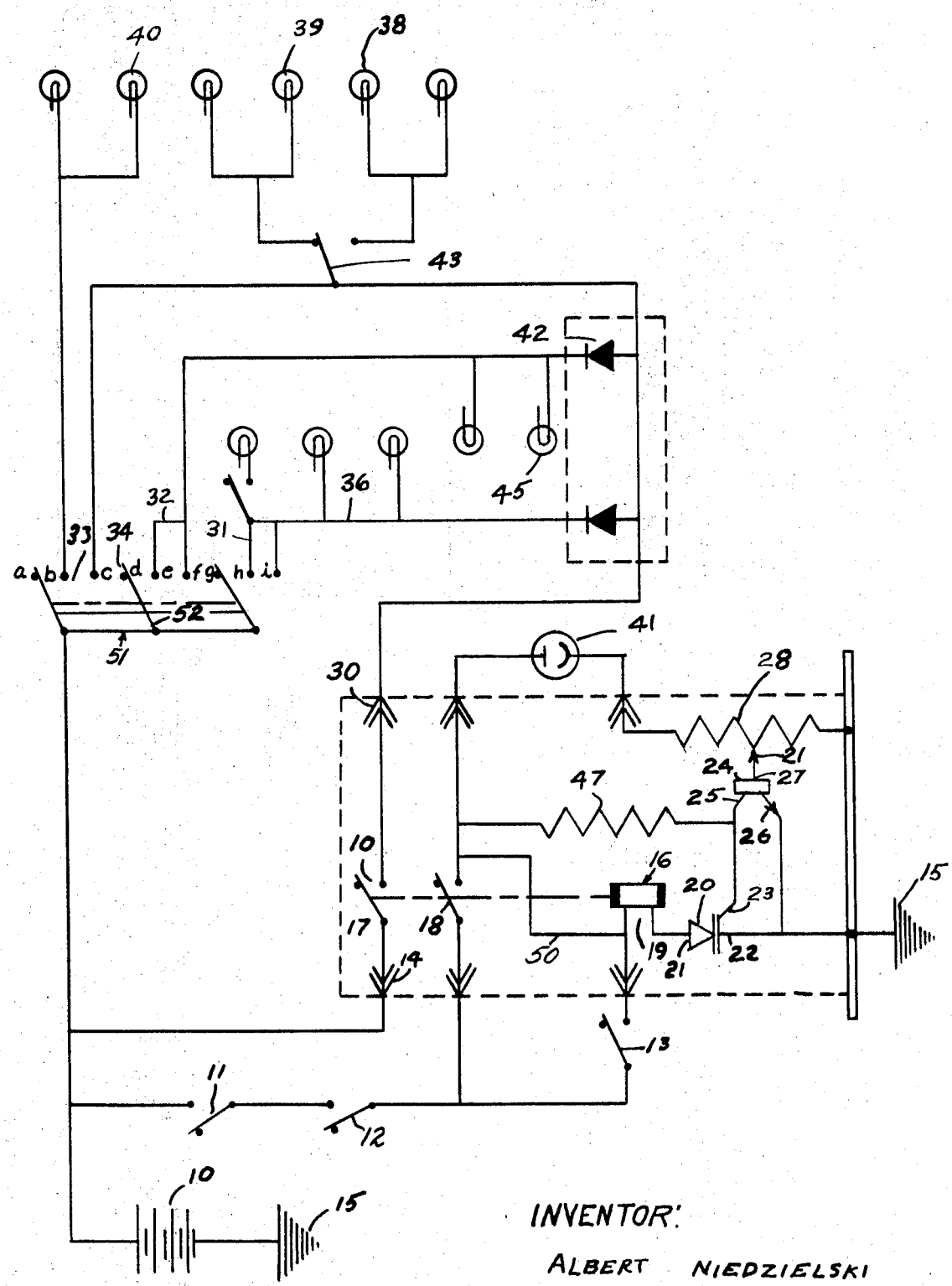

3,538,336
PHOTOELECTRIC HEADLIGHT SWITCH RESPONSIVE TO AMBIENT SIGHT
Albert Niedzielski, 802 Michigan Blvd.,
Erie, Pa. 16505
Filed Dec. 4, 1967, Ser. No. 687,751
Int. Cl. H01j 39/12
U.S. Cl. 250—214                      3 Claims

ABSTRACT OF THE DISCLOSURE

The circuit disclosed is intended to turn the headlights on an automobile on and off by means of a photocell actuated by the ambient light. The sensitivity of the photocell is controlled by a potentiometer and the photocell causes a flow of electricity through the electro-magnetic solenoid of a relay which turns on the lights.

SUMMARY OF INVENTION

The invention discloses a circuit which will turn on the lights of a vehicle automatically when the ambient light is below a predetermined level and when the control member of the automobile is shifted into a position to move the automobile either forward or rearward. The control operates independently of the manual off-on light switch of the vehicle and in no way interferes with the normal switching operation of the lights. A push button switch is included in the automatic light circuit which will turn the lights off when they have been turned on by the automatic circuit and when the ambient light level exceeds a predetermined value. The lights will immediately go back on when the light level is below the predetermined value after the push button has been actuated.

The circuit is intended to be a safety feature for vehicles when through plain negligence or inattention the lights have not been turned on during early dusk hours or when ambient light level is below a safe value.

It is, accordingly, an object of the invention to provide a lighting circuit for a vehicle that will automatically turn the lights of the vehicle on when the vehicle is in motion and when the ambient light level is below a predetermined value.

Another object of the invention is to provide an automatic turn-on device for vehicles which will supplement the manual light switch and insure that the lights of the vehicle will be turned on when the ambient light level is below a predetermined value and when the vehicle is in motion.

Another object of the invention is to provide an automatic device for supplementing the manual control for turning on automobile headlights wherein the lights will automatically be turned on when the ambient light level is below a predetermined value and wherein the lights of the vehicle so turned on by the automatic switch can be turned off only for a short time when the light level is low.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 1 is a schematic wiring diagram of a light control according to the invention.

Now with more particular reference to the drawing, the light control is intended for use on a vehicle having a battery 10 grounded at 15 and connected through a manual lighting switch 34 to the auxiliary lights, such as dash lights, panel lights, and the like, tail lights 45 and through dimmer switch 43 to the headlights which have bright beam 38 and dim beam 39 and to the parking lights 40.

Such a vehicle will normally have an ignition switch 11 and drive-park switch 13. On automobiles that have manual transmissions, the drive-park switch can be added and connected to the gearshift so that if the automobile is in a driving position, the switch 13 can be closed. This switch can likewise be connected to an auxiliary switch on an electrically powered vehicle.

The switch 51 is of the conventional type frequently found on automobiles wherein a pull switch will close its stages 32, 33 and 34 which has an off position and two on positions. The switch 51 will close its movable contacts 52 selectively to terminals a, d, and g in the first position; b, e and h in the second position; and c, f, and i in the third position. In the first on position, it will turn the park lights, tail lights, and auxiliary lights on and, in the second position, it will turn on the headlights 38 and 39 and tail lights 45 and the auxiliary lights.

The control unit will be plugged into plugs 14 and 30. The control unit is made up of relay 16 and electronic valve 20 which is an electronic valve known as a C106F2 and second electronic valve 24 which is known as a ZN3646 component and potentiometer 28. Plugs 14 and 30 may be added to the conventional circuit of the automobile. The photo cell 41 which is known as a CLD51 is likewise added to the conventional circuit and terminal board 42, as well as interrupter button 12. The interrupter button 12 will be connected in series with the ignition switch and the battery side of the park-drive switch 13.

The solenoid 19 of the relay 16 will be connected in series with the battery 10, ignition switch 11, interrupter push button 12, and drive-park switch 13. The solenoid will likewise be connected in series with the first electronic valve 20, which will in turn be connected to ground at 15. Thus when the automobile is in drive position with switch 13 closed and when the engine has been turned on by means of the ignition switch 11 and the normally closed interrupter button 12 is closed, the solenoid 19 will be energized and it will close its contacts 17 and 18. This will interlock solenoid through wire 50 so that it will not drop out when switch 13 is opened.

The photo cell 41 is connected to the battery by way of the ignition switch 11 and interrupter switch 12 and the drive-park switch 13. The photo cell 41 is likewise connected to the ground through the potentiometer 28.

The second electronic valve 24 has its power terminal connected to a point on the negative side of resistor 47.

The adjustable terminal 21 of the potentiometer 28 can be moved up and down on its resistance to raise or lower the voltage potential of the movable contact 21. Thus when a given ambient light intensity exists and when the ignition switch 11 and the drive-park switch 13 are closed, the photo cell 41 will conduct a given amount of light which will result in a given potential drop across the potentiometer 28. The movable contact 29 of potentiometer 28 can be adjusted so that at a particular light level, the electronic valve 24 will conduct a sufficient amount to cause the first electronic valve 20 to conduct a sufficient amount of current to energize solenoid 19 or relay 16. This will close the contacts 17 and 18 on relay 16. The contact 18 interlocks a source of power such as a battery 10 potential to the resistance 47 which is connected directly to the control terminal 23 of the first electronic valve 20 thereby causing valve 20 to continue to conduct and causing solenoid 19 to remain energized. At the same time, the contact 17 on relay 16 will connect power to the accessories and lights 36 and to the dimmer switch 43 where it will be connected to either the bright lights 38 or the dim lights 39 depending on its position.

Assuming that the automobile on which the switch has been installed has just driven through a dark tunnel, the lights will have been turned on by the photo cell 41 because of the low light intensity. The driver may then open the interrupter button 12 which will remain open for an instant, long enough to de-energize solenoid 19 and open its contacts 17 and 18, then if the light level is sufficiently high, photo cell 41 will not re-turn the lights on. On the other hand, if the light level is low, as soon as the interrupter button closes, the photo cell will immediately conduct sufficient current to energize the second electronic valve 24 which will in turn actuate the electronic valve 20 so it will conduct current and energize relay solenoid 19.

A view of the present circuit will indicate that with this circuit the lights on the vehicle will always be on when the light level is below a preset value which may be determined by the setting of the potentiometer 28 and when the switch 13 has been closed even momentarily. Thus, it is impossible to drive the automobile when the light level is below a preset value without the lights being on.

There are many occasions where motorists have, through plain negligence, forgotten to put on their headlights either in the early dusk hours or at times when the ambient light was insufficient as to create a hazard or be deemed unsafe. Under these conditions, with the present invention, the lights would be turned on automatically, using a fixed non-adjustable light measuring device.

The headlights can also be put on automatically during those times of the day when the ambient light is of a predetermined value that would make it difficult to see objects that are moving or standing when the light available is marginal.

The device is set so that the lights will go on automatically only.

The circuit may be so designed that when either the car is moving and/or the engine is running, the automatic circuit would function.

Diodes 42 prevent the headlights 38 and 39 from being turned on through line 51 when the manual switch 34 is in the park light position.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A control circuit for an automobile having a power source, an off-on switch, and a park-drive switch and headlights,
   said power switch and park-drive switch being connected in series with said power source,
   the improvement which comprises,
   a relay, a photo-sensitive cell and a first electronic valve and a second electronic valve,
   said relay having an actuating member,
   one side of said relay actuating member being connected to said park-drive switch and to one side of said photocell,
   a second side of said relay actuating member being connected to a power terminal of said first electronic valve,
   said second electronic valve having a first power terminal connected to a control terminal of said first electronic valve,
   said second electronic valve having a second power terminal connected to a second power terminal of said first electronic valve,
   a sensitivity selector being connected to a control element of said second electronic valve,
   and a switch on said relay,
   said switch closing when said relay is closed whereby said lights are connected to said source of power.

2. The circuit recited in claim 1 wherein said relay has a second contact, said second contact connecting said relay coil to said source of power when said relay is closed whereby said relay coil is interlocked in closed position when said relay is actuated.

3. The circuit recited in claim 1 wherein a timing switch is connected between said power source and said relay coil and in series with said off-on switch and said power switch, whereby said relay coil can be de-energized momentarily whereby said headlights will be turned off, said timing switch being adapted to reclose after a predetermined interval.

References Cited

UNITED STATES PATENTS

| | | | |
|---|---|---|---|
| 3,185,892 | 4/1965 | La Mantia | 317—124 |
| 2,912,593 | 10/1959 | Deuth | 250—214 |
| 3,303,346 | 2/1967 | Atkins et al. | 250—214 |
| 3,347,141 | 10/1967 | Nobusawa et al. | 250—206 |

WALTER STOLWEIN, Primary Examiner

M. ABRAMSON, Assistant Examiner

U.S. Cl. X.R.

250—206; 317—124